Jan. 28, 1941.  H. E. CLARKE  2,230,132
CLUTCH CONTROL DEVICE
Filed April 15, 1938  3 Sheets-Sheet 3
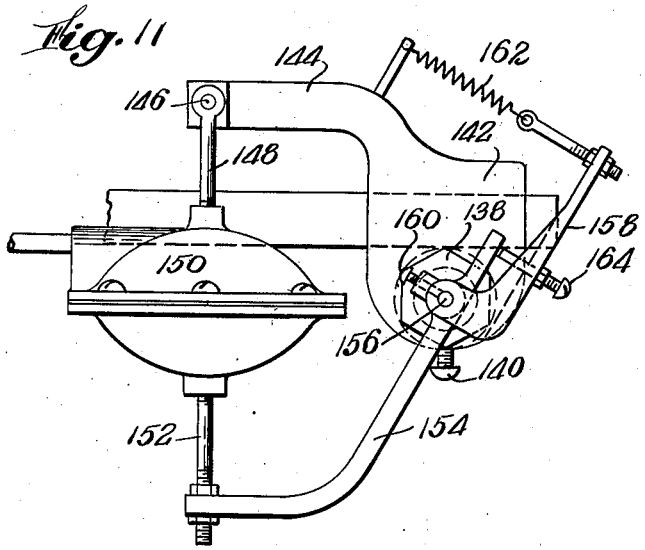
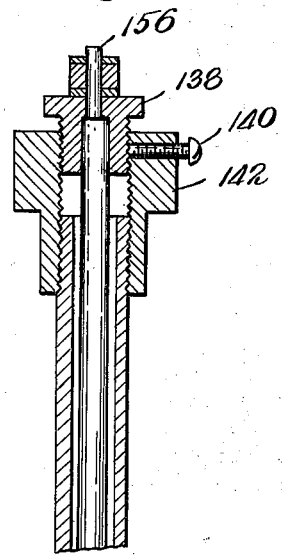
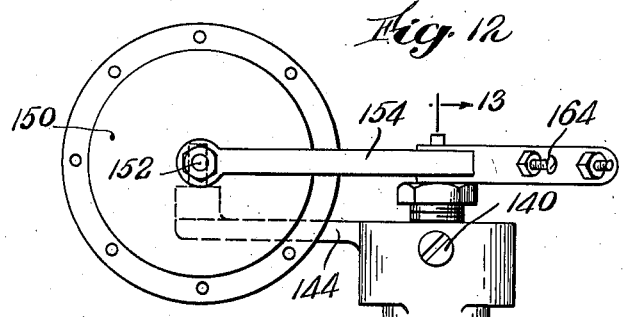
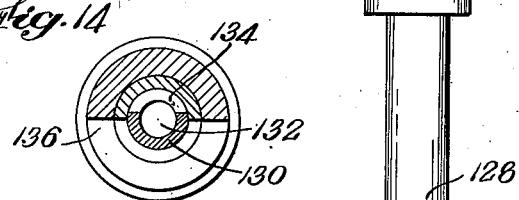
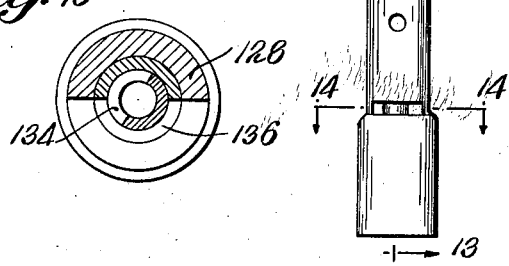
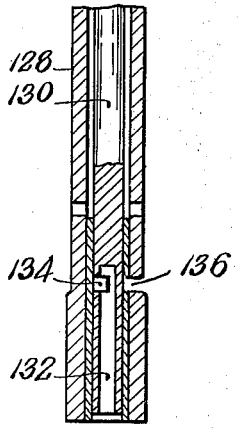
Inventor
HAROLD E. CLARKE
by Thomson & Thomson
his Attys Patented Jan. 28, 1941

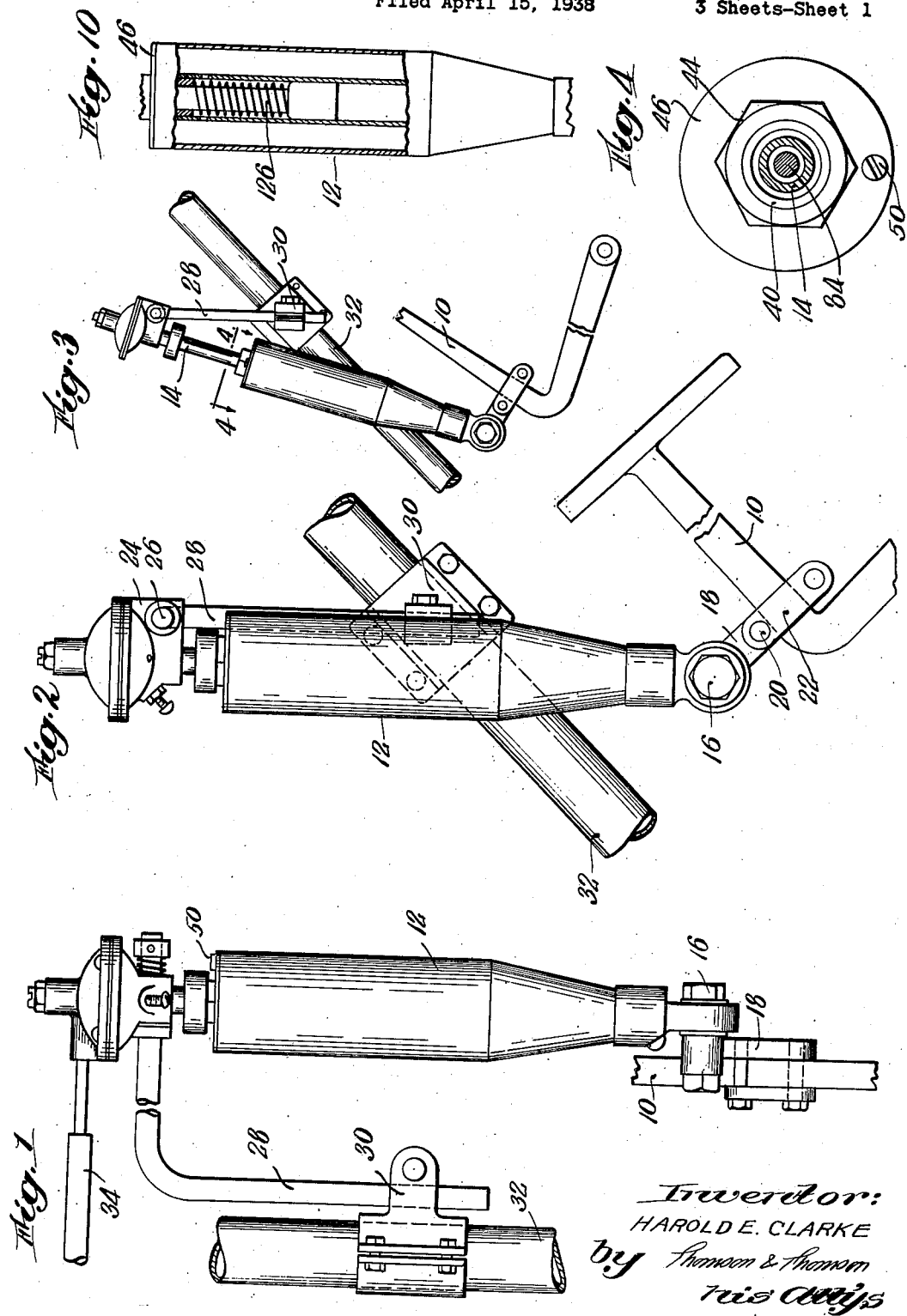

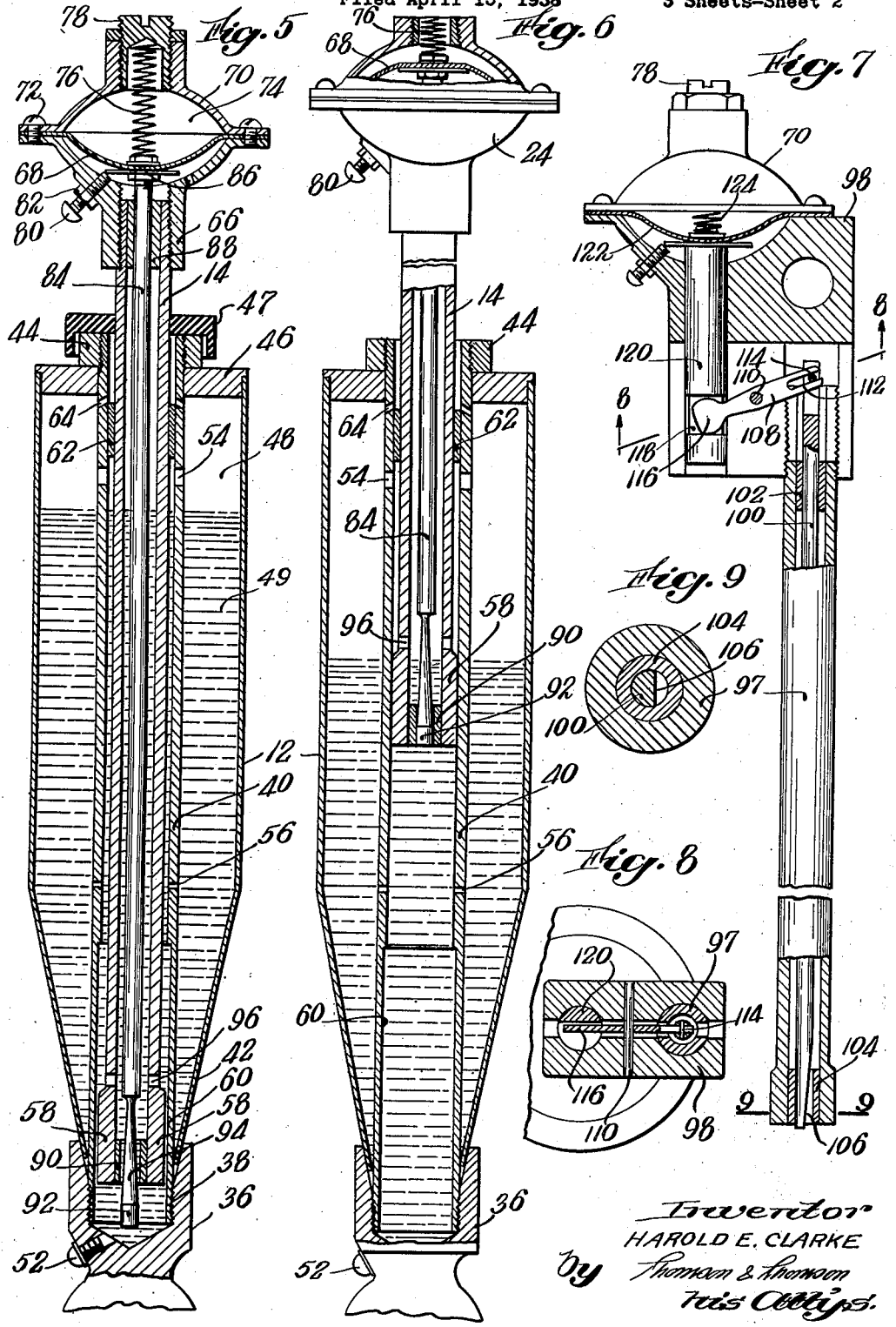

2,230,132

UNITED STATES PATENT OFFICE 2,230,132

CLUTCH CONTROL DEVICE

Harold E. Clarke, West Somerville, Mass.

Application April 15, 1938, Serial No. 202,266

14 Claims. (Cl. 192—109)

This invention relates to improvements in clutch control means and more particularly to means for automatically controlling the engaging movement of a motor vehicle clutch to eliminate the necessity for the operator controlling the clutch engagement by allowing the clutch pedal to return slowly.

In the ordinary motor vehicle it is necessary for the operator to give careful attention to the control of the clutch pedal by his foot as the clutch pedal is allowed to return to permit engagement of the clutch. If the clutch pedal is released too quickly stalling of the engine will frequently occur, on the other hand if the clutch pedal is allowed to return too slowly, slipping of the clutch and racing of the engine will occur. In spite of recent improvements in transmissions, it is still necessary for the operator to use care in the control of the clutch pedal.

In my prior application, Ser. No. 23,428, filed May 25, 1935, now matured as Patent No. 2,132,-721, October 11, 1938, I have disclosed automatic means for controlling the engagement of the clutch, which eliminates the necessity for the operator to use care in allowing the clutch pedal to return at the proper rate to bring about engagement of the clutch at the proper instant. In this prior disclosure, I have shown various modifications in which dash-pot mechanism is associated with a clutch actuated part in such a manner that the dash-pot mechanism has a fluid by-pass from the compression chamber which is controlled by valve means so as to regulate the relative movement. The valve means may be controlled in one of two ways, either by connection to the throttle or by a diaphragm device which is acted upon by suction derived from the intake manifold of the engine. The valve means will be in closed position when the throttle is closed or when there is a high degree of suction in the manifold, normally occurring with a closed throttle. Opening of the throttle or a decrease in the amount of suction in the intake manifold tends to open the valve means to allow a more rapid clutch engaging action. The parts may be so adjusted that with a closed throttle, the clutch engagement action will be retarded and the car will be brought into motion without stalling of the engine. On the other hand, if a quick pickup is desired, opening of the throttle will permit a more rapid clutch engagement without slipping of the clutch and racing of the engine. The present application is a continuation in part of my application, Ser. No. 23,428, filed May 25, 1935, now matured as Patent No. 2,132,721, October 11, 1938, which claims the modification in which the dash-pot is controlled by the throttle, but the present application claims the modification in which the dash-pot is controlled by suction derived from the intake manifold, as well as improvements independent of how the valve is controlled.

It is an object of my invention to provide clutch control means including dash-pot mechanism for resisting the engaging action of the clutch and valve means for controlling the dash-pot actuated by suction derived from the intake manifold.

It is further an object of my invention to disclose clutch control means of the dash-pot type which may be readily installed in motor vehicles and may be properly adjusted and automatically controlled to operate satisfactorily under all conditions of driving and weather, and which will have a long life in service.

In the drawings,

Fig. 1 is a front elevation of the dash-pot mechanism for controlling the clutch, with the parts in normally positions corresponding to the clutch being engaged;

Fig. 2 is a side elevation thereof;

Fig. 3 is a side elevation, somewhat reduced, with the clutch disengaged;

Fig. 4 is a section on the plane indicated 4—4 in Fig. 3;

Fig. 5 is an enlarged vertical section of the dash-pot mechanism showing the valve in open position, with the clutch engaged;

Fig. 6 is a similar vertical section showing the valve closed and the clutch disengaged;

Fig. 7 is an elevation partially in vertical section showing a modified construction of the valve control mechanism;

Fig. 8 is a section on the plane indicated 8—8 in Fig. 7;

Fig. 9 is a section taken on the plane indicated 9—9 in Fig. 7;

Fig. 10 is a fragmentary elevation partially in vertical section showing a modified construction;

Fig. 11 is a plan view of a modified arrangement of the valve control mechanism;

Fig. 12 is a broken side elevation thereof;

Fig. 13 is a vertical section of the dash-pot plunger and rotatable valve;

Fig. 14 is a section taken on the plane indicated 14—14 in Fig. 12 showing the valve in closed position; and Fig. 15 is a section similar to Fig. 14 showing the valve partially open.

The pedal 10 is the clutch pedal which controls the clutch in the usual manner. The clutch may be of any desired construction operated directly from the clutch pedal or by power means controlled by the clutch pedal. In either case the clutch mechanism includes the usual springs for producing clutch engagement and the clutch pedal will be provided with the usual spring to return the pedal to its normal position as the clutch is engaged. The dash-pot mechanism is provided to automatically control the engagement of the clutch during the return movement of the pedal after it has been depressed by the foot of the operator.

The dash-pot mechanism comprises the cylinder 12 and plunger 14. The lower end of the cylinder is connected by pivot bolt 16 through a link 18 to the pivot 20 of bracket 22. The bracket 22 is fixed to the clutch pedal 10 or to any other movable part of the clutch actuating means. The plunger 14 is connected at its upper end to the casting 24 provided with the pivot pin 26 to which is connected the supporting post member 28. The post 28 is mounted with provision for vertical adjustment with respect to the bracket 30 which is fixed to any suitable fixed part of the chassis such as the steering column 32. It will be understood that in Fig. 2, the clutch is engaged and upon depression of the clutch pedal as in Fig. 3 the plunger 14 will be drawn out of the dash-pot cylinder 12. During return movement of the clutch pedal the plunger will be forced into the dash-pot cylinder and resistance will be produced to control the relative movement. The dash-pot mechanism includes valve means later to be described which may be controlled either from the throttle of the motor vehicle as described in my prior Patent No. 2,132,721, October 11, 1938, for clutch control means, or by suction derived from the intake manifold as in the present arrangement in which the pipe 34 leads to the intake manifold.

The dash-pot mechanism is disclosed in detail in Fig. 5. The casting 36, in which the pivot bolt 16 is mounted, is internally threaded at 38 to receive the tubular member 40 which extends through the cylinder 12. The lower end of the cylinder 12 is formed in a conical shape as indicated at 42, and is forced into tight engagement with the casting 36 by the provision of the nut member 44 threaded to the upper end of the tubular member 40, while the top of the cylinder 12 is closed by the head 46. The space between the plunger 14 and tubular member 40 may be closed by the rubber cap 47 which fits over the nut member 44. The cylinder 12 has a reservoir 48 for receiving the fluid such as oil 49 which produces resistance during operation of the dash-pot. The reservoir 48 may be filled through an opening in the head 46, normally closed by the plug 50, and may be drained by removal of the screw plug 52 in the casting 36.

The inner tubular member 40 is provided with relatively large openings 54 near the top of the reservoir to provide for communication between the outer portion of the reservoir and the inner portion of the tubular member 40. The member 40 is also provided with relatively small bleed openings 56 through which the oil is passed from the compression chamber until just prior to the engagement of the clutch. The tubular member 40 forms a cylinder for the piston head 58 at the bottom end of the plunger 14. The lower end 60 of the tubular member 40 is slightly larger than the piston head 58, but as shown in Fig. 6, the upper portion of the tubular member 40 is formed to closely fit the piston head 58. The bleed openings 56 are disposed only a short distance above the beginning of the smaller diameter of the cylinder member 40. The plunger 14 is also guided in the member 40 by the bushing 62 and in order to provide for return of the oil which may pass by the bushing, drain openings 64 are formed in the member 40 immediately below the head 46.

The plunger 14 is threaded at its upper end into the boss 66 of the casting 24. A flexible diaphragm 68 is clamped between the circular marginal portions of the casting 24 and the head 70 which are secured together by the screw members 72. The chamber 74 between the head 70 and the diaphragm 68 communicates with the intake manifold through the pipe 34. The spring member 76 in the chamber 74 normally serves to hold the diaphragm in a depressed position as illustrated in Fig. 5 and the compression of the spring may be adjusted by the threaded plug 78. The downward movement of the diaphragm is limited by the adjustable abutment screw 80 which is normally locked in position by the nut 82.

A valve rod 84 is connected at 86 to the diaphragm and extends downwardly through the plunger 14 and is centered by the bushing 88. The lower end of the piston head 58 receives an internal bushing 90 which closely fits the circular valve head 92 on the valve rod 84. The valve rod is tapered at 94 above the valve head 92 to provide for a variation in the passageway through the bushing 90 in accordance with the position of the valve rod with respect to the plunger 14. The plunger 14, immediately above the piston head 58, is provided with openings 96 to allow flow of the oil from the interior of the plunger 14 into the space between the plunger 14 and the tubular member 40.

Upon depression of the clutch pedal, the relative movement produced between the dash-pot cylinder and the dash-pot plunger bring the parts to the position illustrated in Fig. 6 and with the motor idling the suction in the intake manifold acts upon the diaphragm 68 pulling it upwards to the position shown in Fig. 6 against the resistance of the spring 76 thereby bringing the valve head 92 into a position closing the by-pass passage through the bushing 90. If the clutch pedal is now allowed to return, the piston will move downwardly with respect to the cylinder and the oil is restricted in its escape from the compression chamber to the bleed openings 56 until just prior to the engagement of the clutch when the openings 56 will be covered by the piston head 58 thereby further retarding the movement. If the throttle is moved to accelerate the engine or under other conditions the depression in the intake manifold is changed to approach atmospheric pressure, the diaphragm 68 will be allowed to return, thereby opening the passage through the bushing 90 and permitting a more rapid movement of the piston with respect to the cylinder which results in a more rapid clutch engagement.

A modified form of valve control is illustrated in Figs. 7 to 9. In Figs. 1 to 6 the valve is moved downwardly in the direction of opening and its movement is resisted by the fluid pressure in the compression chamber acting upon the head of the valve thereby requiring a relatively stiff spring to force the valve open against the fluid pressure. In Figs. 7 to 9 the valve is moved upwardly to open, the fluid pressure assists the spring in opening the valve and the spring may therefore be weaker.

In this construction, the plunger 97 is mounted at its upper end in a head member 98 and receives the slidable valve rod 100 guided by the bushings 102 and 104. The lower end of the rod is tapered as at 106 to present a variable orifice through the bushing 104. The rod 100 is moved by the lever 108 pivoted at 110 on the head 98. The lever has at one end a fork shaped portion 112 engaging a pin 114 on the valve rod. The opposite end 116 of the lever is rounded and fits in a notch 118 of the stem 120 which is fixed to the diaphragm 122 and is normally urged to hold the valve open by spring 124.

In order to assist in the full movement of the dash-pot parts to normal positions, a spring 126 may be used reacting between the head of the plunger and the upper bushing as disclosed in Fig. 10. This spring will force the plunger into the cylinder to the limit of its movement and assist the action of the usual spring which returns the pedal. In some cases the pedal spring may be relatively weak and the spring 126 may be needed.

A still further modified form of valve control is illustrated in Figs. 11 to 15 in which the valve rod is rotated instead of reciprocated. The fluid pressure will, therefore, have no effect upon the valve movement. In this arrangement the plunger 128 receives a valve rod 130. The lower end of the valve rod has a fluid passage 132 and a notch 134 forming an orifice therefrom. The valve rod upon rotation brings the notched orifice 134 into communication with the cleft passage 136 in the plunger 128. The valve rod is supported at its upper end by an adjustable threaded collar 138 which is fixed in position by the set-screw 140. By loosening the set screw and turning the collar 138, the valve rod is moved up or down to adjust the effective size of the orifice in the valve rod with respect to the passage in the plunger. The collar 138 is threaded into a frame part 142 which has an arm 144 carrying the pivot 146 for a rod 148 to which the diaphragm casing 150 is connected. The stem 152 is connected to the diaphragm and to a lever 154 freely pivoted on the reduced extension 156 of the valve rod 130. A second lever arm 158 is fixed to the extension 156 by a set screw 160. The lever arm 158 is normally urged by a tension spring 162 in a direction to open the valve passage. The lever 154 actuates the lever 158 through an adjustable set-screw 164. Thus the suction in the intake manifold acts to move the diaphragm, the double lever 154—158 and to rotate the valve rod to close the valve passage.

The device as illustrated in Figs. 1–3 may be readily installed in any type of motor vehicle although if desired it could be built into a motor vehicle when manufactured. In the construction illustrated the cylinder is mounted on the clutch pedal or other part which moves in response to movement of the clutch by means of the bracket 22, the plunger is mounted on the steering column or other suitable fixed part of the vehicle chassis by means of the bracket 30, and a connection is made between the tubular conduit 34 and the intake manifold. The rod 28 which supports the plunger is then adjusted with respect to its bracket 30 so that the piston head 50 of the plunger closes the bleed ports 56 just as the clutch begins to engage. The spring pressure upon the diaphragm 68 is then adjusted by means of the threaded member 78 so that smooth engagement of the clutch is obtained without slipping of the clutch or stalling of the engine. It has been found in service that a dash-pot clutch control device of this general type considerably reduces the wear upon the clutch plates which normally occurs where the clutch is under manual control by the operator. Various changes and modifications may be resorted to in the commercial embodiment of my invention without departing from the spirit of my invention, as expressed in the appended claims.

I claim:

1. In a clutch control for motor vehicles, a clutch actuator, dash-pot means comprising a liquid containing cylinder, a relatively movable piston therein, a liquid by-pass between the opposite ends of said cylinder, a valve controlling the liquid flow through said by-pass, means for producing relative movement between said cylinder and piston through movement of said clutch actuator whereby said dash-pot means tends to retard the engagement of the clutch, and means for automatically moving said control valve to reduce the resistance of the dash-pot means as the engine of the motor vehicle is accelerated.

2. Dash-pot mechanism for automatically controlling the engagement of a motor vehicle clutch comprising a dash-pot cylinder and a dash-pot plunger, means for producing relative movement between said cylinder and plunger during movement of the clutch into engagement, said cylinder having a double wall forming an inner compression chamber and an outer reserve chamber adapted to contain liquid, said plunger having a piston head forming a movable wall of the compression chamber and having an escape passage leading from said chamber towards the reserve chamber, valve means in said piston head for restricting the flow through said escape passage and means for controlling said valve from the outer end of the plunger.

3. Dash-pot mechanism for automatically controlling the engagement of a motor vehicle clutch comprising a dash-pot cylinder composed of two concentrically arranged tubular members, a closure at one end of the tubular members forming a compression chamber within the inner tubular member and a reserve chamber between the walls of the tubular members, a dash-pot plunger adapted to be slidably received within the inner tubular member of the dash-pot cylinder, the inner tubular member being formed to closely fit said plunger during the relative movement thereof corresponding to the engaging movement of the clutch and having a portion of increased diameter to permit unrestricted movement of the plunger and allow full return of the clutch pedal after the clutch is engaged, said inner tubular member having bleed passages between the compression chamber and the reserve chamber adapted to be covered by the head of the plunger as the clutch is brought into engagement whereby the movement thereof is retarded by the dash-pot mechanism, said plunger having an escape passage therein and valve means for controlling said escape passage to vary the action of the dash-pot mechanism.

4. Dash-pot mechanism for controlling the engagement of a motor vehicle clutch comprising a dash-pot cylinder having a compression chamber and a reserve chamber adapted to contain liquid, said cylinder having a liquid escape passage from said compression chamber to said reserve chamber, a dash-pot plunger slidably received in said cylinder, said plunger having a piston head closely fitting the dash-pot cylinder during the initial portion of its travel, a liquid bypass in said piston head, a movable valve member in said bypass for restricting the flow of liquid through said bypass, a valve actuating rod extending through said plunger, said dash-pot cylinder having an enlargement to permit flow of liquid past said piston head during the final portion of its travel, said piston head being adapted to close said escape passage and substantially confine the escape of liquid to the valve controlled bypass for a short portion of its travel until the enlargement around the piston head is reached.

5. Dash-pot mechanism for controlling the engagement of a motor vehicle clutch comprising a dash-pot cylinder having a compression chamber and a reserve chamber adapted to contain liquid, said cylinder having a liquid escape passage from said compression chamber to said reserve chamber, a dash-pot plunger slidably received in said cylinder, said plunger having a piston head closely fitting the dash-pot cylinder during the initial portion of its travel, a liquid bypass in said piston head, a movable valve member in said bypass for restricting the flow of liquid through said bypass, a valve actuating rod extending through said plunger, said dash-pot cylinder having an enlargement to permit flow of liquid past said piston head during the final portion of its travel, said piston head being adapted to close said escape passage and substantially confine the escape of liquid to the valve controlled bypass for a short portion of its travel until the enlargement around the piston head is reached, resilient means for normally holding the valve in open position, and means for moving the valve actuating rod outwardly to close the valve.

6. Dash-pot mechanism for controlling the engagement of a motor vehicle clutch comprising a dash-pot cylinder having a compression chamber and a reserve chamber adapted to contain liquid, said cylinder having a liquid escape passage from said compression chamber to said reserve chamber, a dash-pot plunger slidably received in said cylinder, said plunger having a piston head closely fitting the dash-pot cylinder during the initial portion of its travel, a liquid bypass in said piston head, a movable valve member in said bypass for restricting the flow of liquid through said bypass, a valve actuating rod extending through said plunger, said dash-pot cylinder having an enlargement to permit flow of liquid past said piston head during the final portion of its travel, said piston head being adapted to close said escape passage and substantially confine the escape of liquid to the valve controlled bypass for a short portion of its travel until the enlargement around the piston head is reached, resilient means for normally holding the valve in open position, and means for moving the valve actuating rod inwardly to close the valve.

7. Dash-pot mechanism for controlling the engagement of a motor vehicle clutch comprising a dash-pot cylinder having a compression chamber and a reserve chamber adapted to contain liquid, said cylinder having a liquid escape passage from said compression chamber to said reserve chamber, a dash-pot plunger slidably received in said cylinder, said plunger having a piston head closely fitting the dash-pot cylinder during the initial portion of its travel, a liquid bypass in said piston head, a movable valve member in said bypass for restricting the flow of liquid through said bypass, a valve actuating rod extending through said plunger, said dash-pot cylinder having an enlargement to permit flow of liquid past said piston head during the final portion of its travel, said piston head being adapted to close said escape passage and substantially confine the escape of liquid to the valve controlled bypass for a short portion of its travel until the enlargement around the piston head is reached, resilient means for normally holding the valve in open position and means for closing the valve by rotation of said valve actuating rod.

8. Dash-pot mechanism for controlling the engagement of a motor vehicle clutch comprising a dash-pot cylinder having a compression chamber and a reserve chamber adapted to contain liquid, said cylinder having a liquid escape passage from said compression chamber to said reserve chamber, a dash-pot plunger slidably received in said cylinder, said plunger having a piston head closely fitting the dash-pot cylinder during the initial portion of its travel, a liquid bypass in said piston head, a movable valve member in said bypass for restricting the flow of liquid through said bypass, a valve actuating rod extending through said plunger, said dash-pot cylinder having an enlargement to permit flow of liquid past said piston head during the final portion of its travel, said piston head being adapted to close said escape passage and substantially confine the escape of liquid to the valve controlled bypass for a short portion of its travel until the enlargement around the piston head is reached, means for rotating the valve actuating rod to open and close the valve, and means for adjusting the valve by longitudinal movement of the actuating rod.

9. Dash-pot mechanism for controlling the engagement of a motor vehicle clutch comprising a dash-pot cylinder having a compression chamber and a reserve chamber adapted to contain liquid, said cylinder having a liquid escape passage from said compression chamber to said reserve chamber, a dash-pot plunger slidably received in said cylinder, said plunger having a piston head closely fitting the dash-pot cylinder during the initial portion of its travel, a liquid bypass in said piston head, a movable valve member in said bypass for restricting the flow of liquid through said bypass, a valve actuating rod extending through said plunger, said dash-pot cylinder having an enlargement to permit flow of liquid past said piston head during the final portion of its travel, said piston head being adapted to close said escape passage and substantially confine the escape of liquid to the valve controlled bypass for a short portion of its travel until the enlargement around the piston head is reached, a collar threaded into the outer end of the plunger, said valve actuating rod having a stem of reduced diameter extending through said collar, means secured to said stem for rotating the actuating rod to open or close the valve, said threaded collar constituting means for adjusting the effective area of the valve controlled passage independent of its rotative position.

10. Dash-pot mechanism for controlling the engagement of a motor vehicle clutch comprising a dash-pot cylinder movable in response to the movement of a clutch actuating part, a dash-pot plunger mounted on a fixed part of the vehicle chassis and slidably received in said dash-pot cylinder, said cylinder having a compression chamber and a reserve chamber adapted to contain liquid, a valve controlled bypass between said chambers and means for variably controlling the flow of liquid through said bypass in response to the depression in the intake manifold.

11. Dash-pot mechanism for controlling the engagement of a motor vehicle clutch comprising a dash-pot cylinder movable in response to the movement of a clutch actuating part, a dash-pot plunger mounted on a fixed part of the vehicle chassis and slidably received in said dash-pot cylinder, said cylinder having a compression chamber and a reserve chamber adapted to contain liquid, a valve controlled bypass between said chambers and means for variably controlling the flow of liquid through said bypass in response to the depression in the intake manifold, said means comprising a valve actuating rod extending through said plunger, a diaphragm to which the outer end of said rod is attached, a casing for said diaphragm carried by said plunger, resilient means for normally urging said diaphragm in a direction to open the valve and means for moving said diaphragm to close the valve by suction derived from the intake manifold.

12. In a clutch control for motor vehicles, a clutch actuator, dash pot means for resisting under compression the movement of said actuator in the direction for clutch engagement, said dash pot means comprising a casing having a compression chamber and a reservoir, a piston associated with the compression chamber and forming a movable wall thereof, a valve controlled bypass leading from said compression chamber to the reservoir, and means operatively connected to the bypass valve for varying the effective action of said dash pot means in accordance with the depression in the intake manifold whereby said dash pot means is most effective with a high depression and less effective with a low depression.

13. In a clutch control for motor vehicles, a clutch actuator, dash pot means for resisting under compression the movement of said actuator in the direction for clutch engagement, said dash pot means comprising a casing having a compression chamber and a reservoir, a piston associated with the compression chamber and forming a movable wall thereof, a valve controlled bypass leading from said compression chamber to the reservoir, and means operatively connected to said bypass valve for automatically varying the action of said dash pot means to reduce the resistance of the dash pot means as the engine of the motor vehicle is accelerated.

14. In a clutch control for motor vehicles, a clutch actuator, dash pot means for resisting under compression the movement of said actuator in the direction for clutch engagement, said dash pot means comprising a casing having a compression chamber and a reservoir, a piston associated with the compression chamber and forming a movable wall thereof, a valve controlled bypass leading from said compression chamber to the reservoir, a second bypass between said compression chamber and said reservoir adapted to be closed by relative movement of the piston just prior to clutch engagement and means operatively connected to the valve of the valve controlled bypass to reduce the resistance of the dash pot means as the engine of the motor vehicle is accelerated.

HAROLD E. CLARKE.